(12) United States Patent
Hrastnik

(10) Patent No.: US 7,268,474 B2
(45) Date of Patent: Sep. 11, 2007

(54) ALLOY, ELECTRODE WITH THE ALLOY, AND IGNITION DEVICE WITH THE ALLOY

(75) Inventor: Klaus Hrastnik, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 15 days.

(21) Appl. No.: 10/436,668

(22) Filed: May 13, 2003

(65) Prior Publication Data

US 2003/0218411 A1    Nov. 27, 2003

(30) Foreign Application Priority Data

May 18, 2002  (DE)  ............................ 102 22 262

(51) Int. Cl.
*C22C 19/05* (2006.01)
*H01T 13/20* (2006.01)
(52) U.S. Cl. .................. 313/141; 313/326; 420/442; 420/445; 148/410
(58) Field of Classification Search .............. 313/118, 313/141, 326; 420/442, 445, 448, 458; 148/410
See application file for complete search history.

(56) References Cited

U.S. PATENT DOCUMENTS

| | | | | | |
|---|---|---|---|---|---|
| 2,515,185 | A | * | 7/1950 | Bieber et al. | ............... 420/446 |
| 3,653,987 | A | * | 4/1972 | Boesch | ....................... 148/675 |
| 3,832,167 | A | * | 8/1974 | Shaw et al. | ................. 420/450 |
| 4,035,182 | A | * | 7/1977 | Kowaka et al. | ........... 420/584.1 |
| 4,227,925 | A | * | 10/1980 | Hosoi et al. | ................ 420/443 |
| 4,329,174 | A | | 5/1982 | Ito et al. | |
| 4,460,542 | A | * | 7/1984 | Herchenroeder | ............ 420/443 |
| 4,742,265 | A | | 5/1988 | Giachino et al. | |
| 6,458,318 | B1 | * | 10/2002 | Nishiyama et al. | ......... 420/448 |
| 6,749,894 | B2 | * | 6/2004 | Subramanian et al. | ...... 427/239 |
| 2002/0124913 | A1 | * | 9/2002 | Uehara et al. | .............. 148/325 |

FOREIGN PATENT DOCUMENTS

| JP | 06264169 A | * | 9/1994 |
|---|---|---|---|
| JP | 11-063251 | * | 3/1999 |

* cited by examiner

*Primary Examiner*—Karabi Guharay
(74) *Attorney, Agent, or Firm*—Michael J. Striker

(57) ABSTRACT

A nickel alloy has 10-20 weight percent of chromium, and 1-4 weight percent of an element selected from the group consisting of aluminum, silicium and both, and can be used in an electrode, for example in an ignition device.

2 Claims, 1 Drawing Sheet

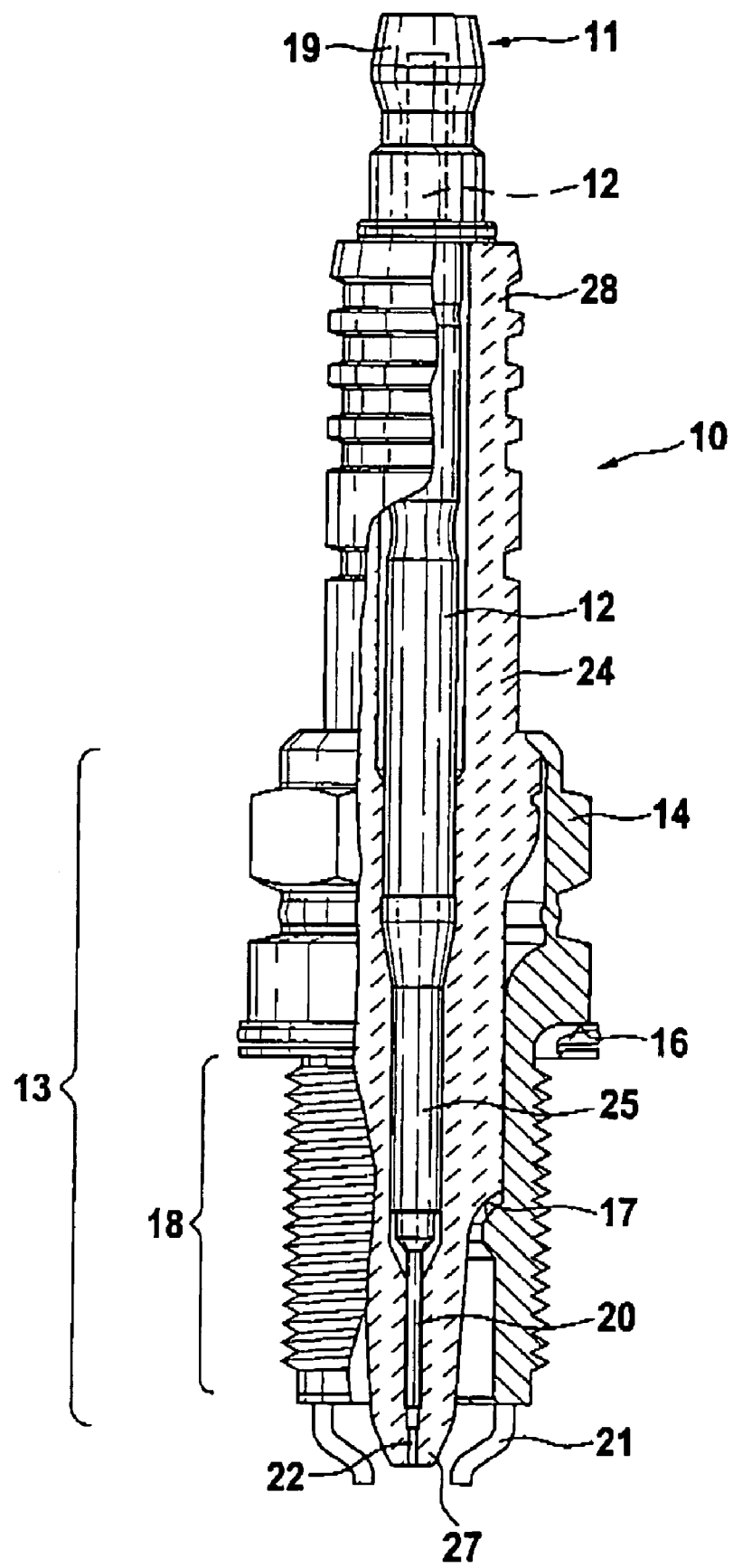

ALLOY, ELECTRODE WITH THE ALLOY, AND IGNITION DEVICE WITH THE ALLOY

BACKGROUND OF THE INVENTION

The present invention relates to an alloy, as well as to an electrode which contains the alloy and to an ignition device which contains the alloy.

Alloys, in particular for application in spark plug electrodes must satisfy extreme requirements with respect to corrosion and temperature resistance. For this purpose high-melting and poorly-oxidizable metal alloys are primary utilized. Nickel alloys are utilized frequently as basic alloys for center electrodes and ground electrodes of spark plugs.

U.S. Pat. No. 4,742,265 discloses a spark plug, in which a center electrode is formed at least partially of a metal alloy, which has a high content of chromium and aluminum. There is here however a danger of a two-phase formation in the alloy joint and thereby a short service life of such electrodes.

U.S. Pat. No. 4,329,174 discloses further nickel alloys, which have a low content of chromium, silicium, and aluminum. They however have a limited corrosion resistance.

SUMMARY OF THE INVENTION

Accordingly, it is an object of the present invention to provide an alloy which is a further improvement of the existing alloys.

More particularly, it is an object of th present invention to provide a metal alloy which can be well processed and moreover has high, melting and corrosion-resistance.

In keeping with these objects and with others which will become apparent hereinafter, one feature of the present invention resides, briefly stated, in an alloy, in particular a nickel alloy, which has 10-20 weight percent of chromium, 1-4 percent of aluminum and/or 1-4 weight percent of silicium.

Since the alloy has a high chromium portion, it is resistant against lead and sulfur compounds in fuel. The aluminum portion or the silicium portion of the alloy is selected so that the alloy on one hand does not form two-or multi-phase system, and on the other hand is sufficiently protected from heat corrosion process.

In accordance with a further feature of the present invention the alloy can additionally have a small portion of yttrium. This increases the corrosion resistance of the alloy. Moreover, up to 10 weight percent of the alloy can be formed by iron.

The alloy is suitable in particular as a material for electrodes, which are used in spark plugs, since the alloy has high strength and therefore it is possible to dispense with a heat-conductive core in the center of the electrode.

In accordance with another feature of the present invention, an electrode is proposed which has 10-20 weight percent of chromium; and 1-4 weight percent of an element selected from the group consisting of aluminum, silicium and both.

In accordance with still a further feature of the present invention, an ignition device is proposed, which has a central electrode, a ground electrode, at least one of the electrodes being composed of a nickel alloy, comprising 10-20 weight percent of chromium; and 1-4. weight percent of an element selected from the group consisting of aluminum, silicium and both.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

The single FIGURE of the drawings is a view showing a cross-section of a spark plug with the use of an alloy in accordance with the present invention.

DESCRIPTION OF THE PREFERRED EMBODIMENTS

The drawing show a spark plug of the present invention which is identified as a whole with reference numeral 10. It has a tubular metallic housing 13 with a ceramic insulator 24 arranged in it. The insulator 24 surrounds in its combustion-side end 27 a center electrode 22 and insulates it electrically from the housing 13.

The spark plug further contains a contact pin 20 which serves for transmission of the voltage to the center electrode 22. A connection element 11 is arranged at its connection end 28. The connection element 11 guarantees the electrical contacting of the center electrode 22 to an external, not shown voltage source. It has substantially a connection pin 20 provided with a thread on its connection side, and a connection nut 19. A burn-off resistor 25 is located between the connection element 11 and the contact pin 20. The burn-off resistor 25 is composed of an electrically conductive glass. It provides both a mechanical anchoring of the spark plug components arranged in the insulator 24, and also a gas-tight protection from the combustion pressure.

An inner sealing seat 17 is located between the insulator 24 and the housing 13. It seals the interior of the spark plug 10 relative to the combustion chamber. One or several ground electrodes 21 are welded on the housing 13. A spark is produced between them and the central electrode 22.

The housing 13 on its other side has a hexagon 14 for screwing-in of the spark plug into a motor block. Furthermore, an outer sealing seat 16 is provided which seals the exterior atmosphere from the combustion chamber. A screwing-in thread 18 embossed on the housing 13 serves for anchoring of the spark plug in the motor block.

At least one of the electrodes 21, 22 is composed of a multi substance alloy, for example with nickel base. The alloy contains in particular a relatively high portion of 10-20 weight percent, preferably 10-15 weight percent of chromium, and also a small portion of 1-3 weight percent, in particular 1-2 weight percent of silicium or aluminum. In addition it is advantageous to provide a small portion of 0.01-0.2 weight percent of yttrium to improve the coating resistance. This guarantees a high heat corrosion resistance and burn-off resistance of the electrodes 21, 22. Particularly advantageous is to provide an alloy which has both 1-3 weight percent of aluminum and 1-3 weight percent of silicium.

Further alloy components can include up to 10 weight percent of iron, as well as small quantities of molybdenum, cobalt, niobium, tantalum and/or metals of the rare earth.

A particularly preferable alloy has the following composition:

13.5 weight percent chromium,
1.5-2 weight percent silicium
1.5-2 weight percent aluminum 0.05-0.1 weight percent yttrium rest: nickel The alloys in accordance with the present invention have a very high heat conductivity. The conventional construction of spark plug electrodes as composite electrodes with heat-conductive core composed as a rule of copper and a casing including conventionally a nickel alloy can be maintained. There is however a possibility to form the electrodes 21, 22 as single-material electrodes composed of the inventive alloy. The electrodes in both cases can additionally have noble metal tips, on which the ignition spark is formed.

The application of the inventive alloys is not limited to spark plug electrodes. They can be used also in heating gas installations, for example as electrodes in its corresponding gas sensors.

It will be understood that each of the elements described above, or two or more together, may also find a useful application in other types of constructions differing from the types described above.

While the invention has been illustrated and described as embodied in alloy, electrode provided with the alloy, and dishing device provided with the alloy, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

The invention claimed is:

1. A nickel alloy, wherein the alloy contains 13.5 weight percent of chromium, 1.5-2 weight percent of aluminum, 1.5-2 weight percent of silicium, and also 0.05-0.1 weight percent of yttrium, and about 82.4 weight percent of nickel.

2. An electrode for a gas sensor, composed of a nickel alloy containing 13.5 weight percent of chromium, 1.5-2 weight percent of aluminum, 1.5-2 weight percent of silicium, and also 0.05-0.1 weight percent of yttrium, and about 82.4 weight percent of nickel.

* * * * *